United States Patent [19]
Jacobson

[11] Patent Number: 5,360,194
[45] Date of Patent: Nov. 1, 1994

[54] SUPPORT ASSEMBLY FOR OPTICAL EQUIPMENT

[76] Inventor: Kenneth R. Jacobson, 2150 NE. Division, Bend, Oreg. 97708

[21] Appl. No.: 960,593

[22] Filed: Oct. 13, 1992

[51] Int. Cl.⁵ ............................................. F16M 13/00
[52] U.S. Cl. ................... 248/431; 248/558; 248/911; 248/912; 248/300; 354/74
[58] Field of Search ............ 248/165, 431, 163.1, 248/177, 911, 912, 187, 670, 440.1, 310, 300, 346, 172, 558, 172; 354/72, 74, 81, 293

[56] References Cited

U.S. PATENT DOCUMENTS

| | | |
|---|---|---|
| 361,826 | 4/1887 | Lewis . |
| 513,058 | 1/1894 | Rahmer . |
| 658,958 | 10/1900 | Morrell et al. . |
| 667,624 | 2/1901 | Hogan .............................. 248/177 |
| 1,731,139 | 10/1929 | Kift ................................. 248/167 X |
| 1,789,317 | 9/1929 | McLeish . |
| 1,878,788 | 9/1932 | Luff .................................. 248/172 |
| 2,166,258 | 7/1939 | Matrat . |
| 2,456,519 | 12/1946 | Long . |
| 3,604,371 | 9/1971 | Cavalucci . |
| 3,685,162 | 8/1972 | Haun ............................... 248/170 X |
| 3,704,848 | 12/1972 | Trebes et al. ........................ 248/187 |
| 3,810,647 | 5/1974 | Martchenke . |
| 4,029,246 | 6/1977 | Woodruff ......................... 354/293 X |
| 4,033,653 | 7/1977 | Doring et al. .................... 248/172 X |
| 4,079,908 | 3/1978 | Davis . |
| 4,219,268 | 8/1980 | Uchida . |
| 4,993,398 | 2/1991 | Wallace ........................... 248/688 X |
| 5,055,864 | 10/1991 | Slikkers ................................ 354/81 |

FOREIGN PATENT DOCUMENTS

| | | | |
|---|---|---|---|
| 11372 | 7/1891 | United Kingdom ............. 248/188.1 |
| 12839 | 6/1893 | United Kingdom ................. 248/164 |

*Primary Examiner*—Karen J. Chotkowski
*Attorney, Agent, or Firm*—William A. Birdwell & Associates

[57] ABSTRACT

An assembly having a plurality of elongate feet for supporting optical equipment. The feet are attached to the optical equipment by a fastener. A plurality of alternate carrier holes or an H-shaped aperture are provided in each foot so that, with the fastener disposed through any one such hole or at any one position in said H-shaped aperture, the fastener may be screwed into the adapter hole of the optical equipment. The feet are adapted to rotate about the fastener in respective planes parallel to the bottom of the optical equipment. Each foot has a plurality of alternate leg holes for receiving objects which function as legs supporting the assembly.

23 Claims, 3 Drawing Sheets

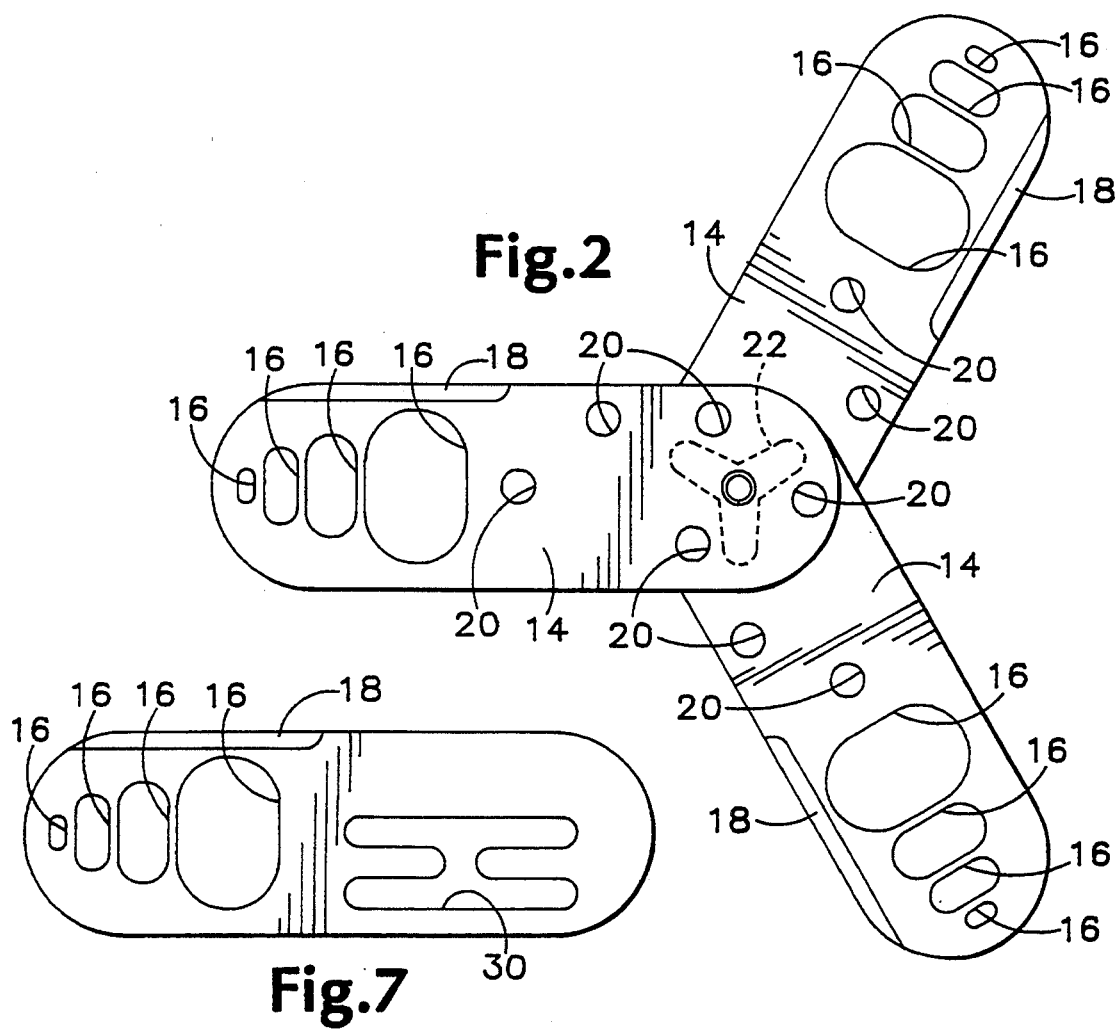
Fig.2
Fig.7
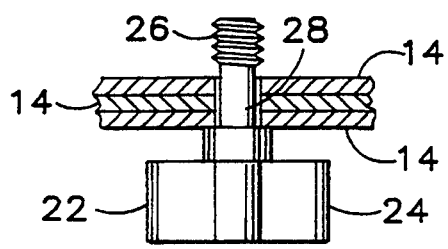
Fig.3
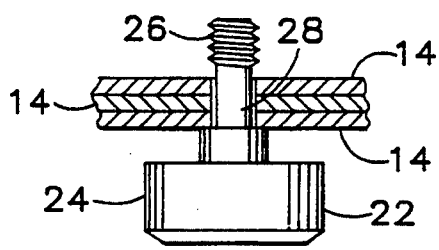
Fig.5
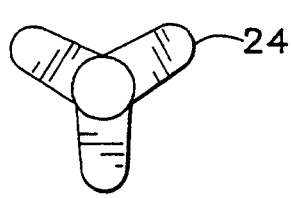
Fig.4
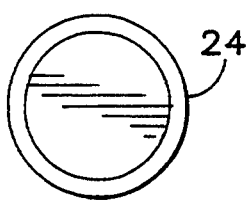
Fig.6

SUPPORT ASSEMBLY FOR OPTICAL EQUIPMENT

BACKGROUND OF THE INVENTION

This invention relates to supports for optical equipment, particularly support assemblies that are adapted to be mounted to the bottom of optical equipment and accommodate a variety of elongate objects commonly found or employed outdoors which function as legs to create a makeshift, but stable, platform for supporting the optical equipment.

In using optical equipment, such as a camera or telescope, it is often desirable to provide a stable support so that an image may be viewed free of vibrations. For example, in photography, a stable support, other than the user's hands, is required for a camera at slow shutter speeds so that fixed-image pictures may be taken. That stable support is most commonly accomplished using a tripod mounted to the bottom of the camera or telescope by means of an adaptor hole generally provided on optical equipment as a standard feature.

Tripods, though available in a variety of styles and sizes, tend to be somewhat heavy and bulky in that they typically have an adjustable central element for attachment to optical equipment, three elongate legs and hinges for attaching the legs to the central element. Examples of such tripods are described in Hogan U.S. Pat. No. 667,624, Rahmer U.S. Pat. No. 513,058 and McLeish U.S. Pat. No. 1,789,317. Accordingly, conventional tripods are not well adapted for use in outdoor activities such as camping and hiking wherein a minimum of weight and bulk is needed in gear to be transported.

In addition to using tripods to accomplish stable support, stable support is commonly accomplished using monopods mounted to the bottom of the camera or telescope by means of the adapter hole therein. Monopods are available in a variety of styles and sizes, typically having a single elongate leg with an element for attachment to the optical equipment. Monopods generally are superior to tripods for use in certain sports, such as skiing, because their weight and bulk tend to be less than tripods providing similar elevation. Nevertheless, monopods are too heavy and bulky for and, not well adapted for use in, those outdoor activities such as camping and hiking wherein a minimum of weight and bulk is needed in gear to be transported. Monopods are described, for example, in Martchenke U.S. Pat. No. 3,810,647 and Davis U.S. Pat. No. 4,079,908.

Stable support for optical equipment has been accomplished using apparatus other than tripods and monopods. Trebes et al. U.S. Pat. No. 3,704,848 discloses a platform having an aperture therein for attachment to the bottom of the optical equipment, and integral, downwardly protruding legs, at least one being vertically adjustable. This platform is light in weight and has minimal bulk because the legs are mere protrusions and the body is a flat plate. However, this platform's utility is largely confined to leveling the optical equipment. With mere protrusions for legs, this platform is not well adapted for elevating optical equipment. Moreover, increasing the length of the legs to allow elevation would introduce weight and bulk, thereby defeating the advantage of this platform.

Because conventional optical equipment support assemblies, such as tripods, monopods and platforms have inherent shortcomings, a need exists for an improved support assembly.

SUMMARY OF THE INVENTION

The present invention fulfills the need for an improved portable support for optical equipment, overcomes the shortcomings of prior art tripods and provides certain advantages not heretofore available in such devices, by providing a support assembly that is light and compact, and is storable during transport flat against and within the footprint of the optical device with which it is used. In a preferred embodiment, the support assembly comprises a plurality of planar, elongate feet attached to an optical device by a threaded fastener having a winged or a round, knurled head. Ordinarily, three such feet are provided. A plurality of alternate carrier holes are provided in the feet in locations that conform to the position of the adaptor hole in optical devices, such as cameras or telescopes, of selected makes and models. Alternatively, the carrier holes may be replaced by an H-shaped aperture. The threaded fastener is disposed through a selected carrier hole or through a location in the H-shaped aperture of each respective foot and screwed into the adaptor hole on the bottom of the optical equipment. The feet are adapted to rotate about the fastener in respective planes parallel to the bottom of the optical equipment. Each has a plurality of alternate leg holes for receiving various objects commonly encountered or used outdoors, such as ski poles, arrows and branches, which function as legs for the support assembly.

The feet have substantially uniform respective dimensions and an elongate shape such that they conform to the footprint of the optical device so that, in transport, they may be disposed on top of one another flush against and substantially within the footprint of the bottom of the optical device and secured by the fastener. In use, the feet are rotated about the fastener to extend outwardly therefrom in different directions so that each foot is at an angle selected to provide stability. A suitable, convenient, elongate item is inserted in a leg hole of each foot to serve as a leg, thereby elevating the assembly and providing a stable platform for the optical device.

Preferably, at least one foot includes a knife edge that can be used to prepare objects for insertion in leg holes.

Accordingly, a principal object of the present invention is to provide a novel and improved optical equipment support assembly.

It is another object of the present invention is to provide an optical equipment support assembly that is adapted for use in outdoor activities, such as in hiking or camping.

It is a further object of the present invention is to provide an optical equipment support assembly that is light and compact.

It is another object of the present invention to provide an optical equipment support assembly that is adopted to employ objects commonly found or used outdoors to act as legs for the assembly.

It is yet a further object of the present invention to provide an optical equipment support assembly that is storable during transport flush against and substantially within the footprint of the bottom of the optical device with which it is used.

It is yet another object of the present invention to provide an optical equipment support assembly that is easy to manufacture and to use.

The foregoing and other objects, features, and advantages of the invention will be more readily understood upon consideration of the following detailed description of the invention, taken in conjunction with the accompanying drawings.

BRIEF DESCRIPTION OF THE DRAWINGS

FIG. 2 a top view of the optical equipment support assembly of FIG. 1 without the camera and arrows.

FIG. 3 is a side, partially cut-away view of the optical equipment support assembly of FIG. 2.

FIG. 4 is a bottom view of the head of the fastener of FIG. 2.

FIG. 5 is a side, partially cut-away view of the optical equipment support assembly of FIG. 2, except that a fastener having a round head has been substituted for the fastener shown in FIG. 2.

FIG. 6 is a bottom view of the fastener of FIG. 5.

FIG. 7 is a top view of a foot for use in an alternative embodiment of the optical equipment support assembly according to the present invention.

DETAILED DESCRIPTION OF THE INVENTION

Figure 1:
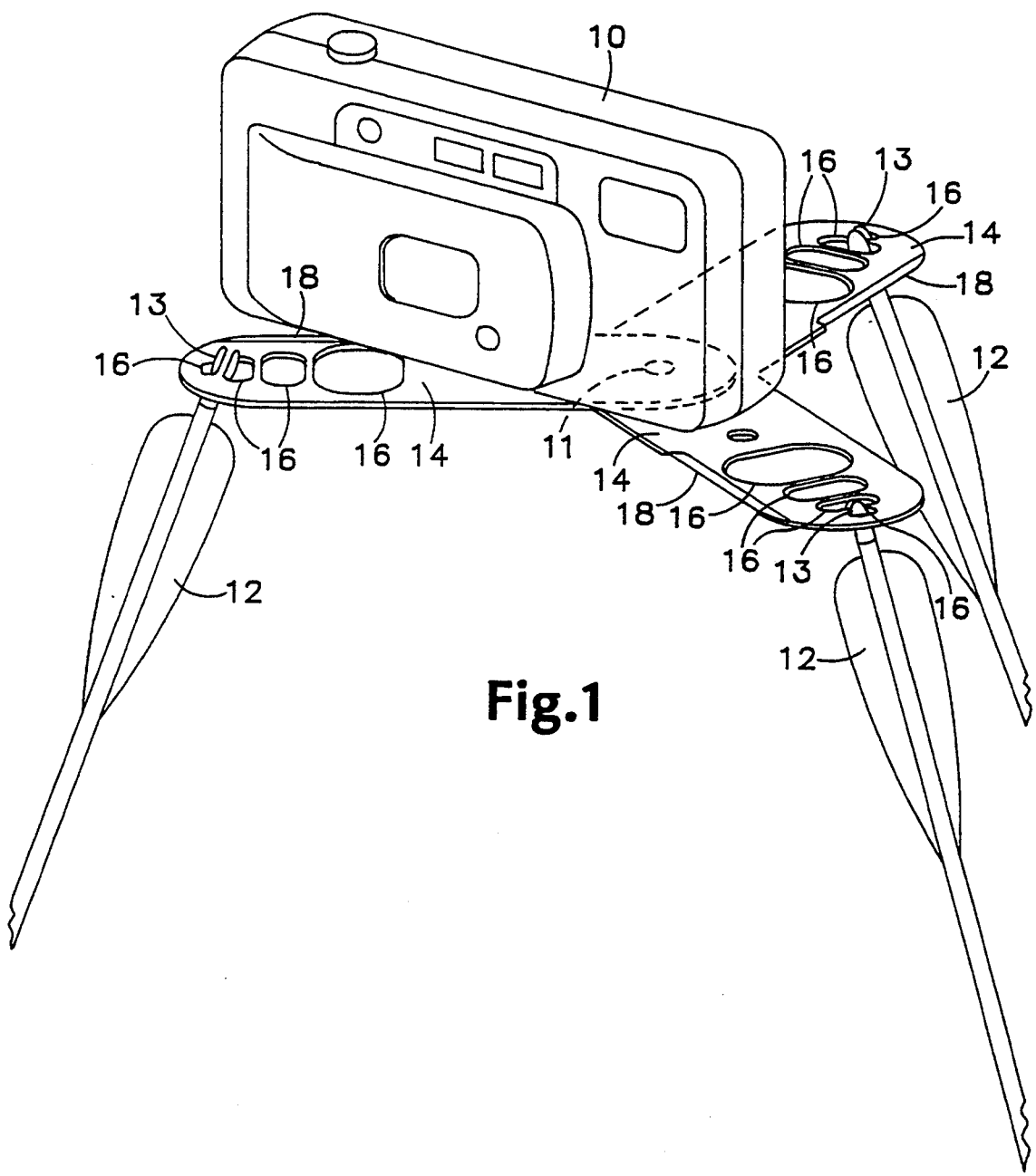
FIG. 1 is a perspective view of a preferred embodiment of an optical equipment support assembly according to the present invention, attached to a camera and using three arrows, shown cut away, as legs.
Figure 8:
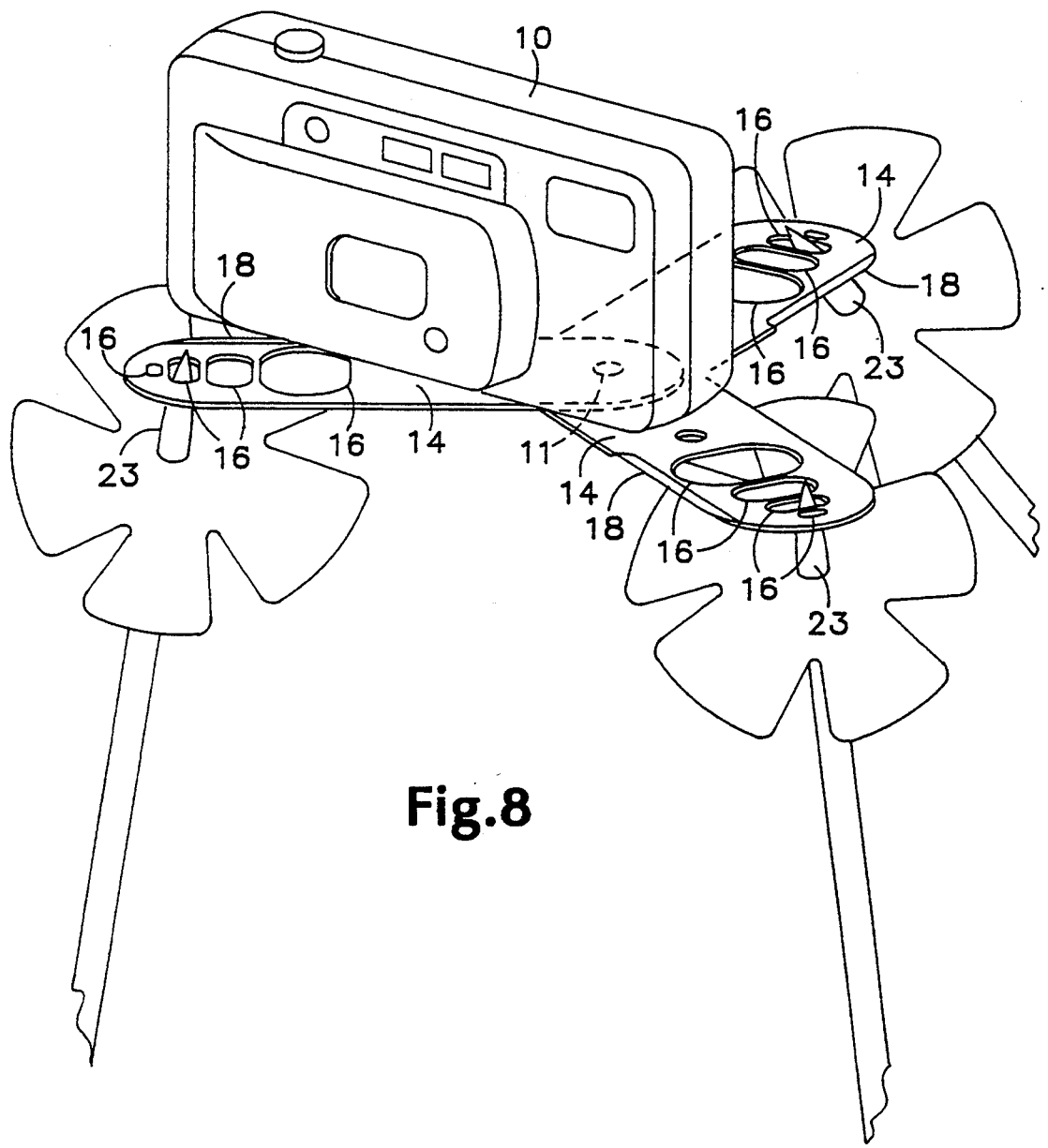
FIG. 8 is a perspective view of the preferred embodiment of an optical equipment support assembly attached to a camera and using three ski poles, shown cut away, as legs.

A preferred embodiment of the optical equipment support assembly according to the present invention is shown in FIG. 1 attached to the bottom of a camera 10 by a fastener (not shown) screwed into an adapter hole 11. Three arrows 12 having nocks 13 are employed as legs to provide stable support for the camera. Although the embodiment shown is attached to a particular style of camera 10, it is to be recognized that the support assembly may be used with cameras of other sizes and shapes as well as with other optical equipment without departing from the principles of the invention.

Referring to FIG. 2, as well as FIG. 1, the support assembly has three elongate feet 14 that are substantially planar and have substantially uniform respective dimensions. The dimensions and shape of the feet 14 preferably are adapted to conform to the footprint of the bottom of a camera, such as camera 10, so that the feet may be stored on top of one another flush against and substantially within the footprint of the camera 10. While it is recognized that many cameras have different shapes and sizes, the bottom footprint is somewhat standardized by industry practice so that an elongate foot with rounded ends 15, as shown in FIGS. 1 and 2, will generally satisfy the aforementioned object if the foot is made in one of only a few different sizes. Preferably, the feet 14 are made of narrow gauge aluminum, though they may be made of hard plastic, aluminum or any other lightweight, yet durable material.

Each foot 14 has a plurality of leg holes 16 of various sizes and shapes. The leg holes 16 are adapted to receive a variety of objects typically encountered or used outdoors which, when inserted in the leg holes, function as legs. As shown in FIG. 1, for example, one leg hole 16 is adapted to receive one side of the nock 13 of an arrow 12 so that the arrows 12 function as legs. The sizes and shapes may correspond to objects, such as arrows or ski poles, that are likely to be encountered in a specific outdoor activity or to a variety of such activities. Preferably, however, the leg holes 16 are all oblong and of regularly increasing size, as it has been found that this maximizes the variety of objects that can be used as legs. This is especially the case where natural objects, such as branches, are to be used as legs. It is to be recognized, however, that the leg holes 16 can be of any size and shape without departing from the principles of the invention.

One or more feet preferably includes a knife edge 18. The knife edge 18 can be used to prepare objects for insertion in the leg holes 16, for example, to shape the ends of branches to a taper. Other types of tools might also be formed in one or more of the feet.

In one embodiment, the feet 14 have a plurality of alternate carrier holes 20 that are disposed through the feet 14 at locations common to each foot 14. These locations are chosen so that, for the most common camera footprint configurations, one of the holes 20 will coincide with the position of the adapter hole 11 of the camera when the foot is disposed substantially with the footprint of the camera.

Referring to FIGS. 2, 3 and 4, the support assembly includes a fastener 22 that has at one end a head 24, at the other end threads 26, and a shank 28 therebetween. Although in the embodiment shown, the head 24 of the fastener 22 is winged, it is to be recognized that the head 24 may be other shapes without departing from the principles of the invention. FIGS. 5 and 6 show the fastener 22 having a head 24 that is round and preferably has a knurled side surface 30 to facilitate tightening of the fastener 22. The fastener 22 is disposed through a selected carrier hole 20 in respective feet 14 and screwed by threads 26 into the adaptor hole generally provided on the bottom of optical equipment, for example, adapter hole 11 of camera 10, so as to attach the feet 14 to the optical equipment.

The feet 14 are adapted to rotate about the shank 28 of the fastener 22 to extend outwardly therefrom in respective planes parallel to the bottom of the optical equipment. As shown in FIG. 1, the feet 14 ordinarily are selectively disposed at angles of approximately 120 degrees relative to each other. However, it is to be recognized that the feet 14 may be selectively disposed at any relative angles that result in stable support without departing from the principles of the invention. As described previously, with the feet 14 so rotated, the support assembly is then elevated, and the optical equipment stably supported for use, by inserting selected objects, such as ski poles, arrows or other suitable objects in respective leg holes 16 of each foot 14.

Although in the embodiment shown, the threads 26 extend from the end of the fastener 22 to a distance along the shank 28 away from the surface of the foot 14 closest to the optical equipment, it is to be recognized that the threads 26 may extend further along the shank 28 toward the head 24 without departing from the principles of the invention. In any case, the threads 26 should begin a selected distance from the head 24 and be a length such that the shank can be screwed far enough into the adapter hole to secure the feet tightly against the bottom of the optical equipment, the depth of the adapter hole typically being somewhat limited.

As shown in FIG. 7, an alternative embodiment of the support assembly preferably employs feet 14 having an H-shaped aperture 30, instead of the plurality of carrier holes 20, for attaching and positioning the feet 14 to the optical equipment. As with the carrier holes 22, the fastener 22 is disposed through the H-shaped aperture 30 in respective feet 14 and screwed by threads 26 into the adaptor hole generally provided on the bottom of optical equipment. The H-shaped aperture 30 preferably is adapted so that it provides positions for the fastener 22 that conform to the positions of the adaptor hole of selected makes and models of optical equipment.

The terms and expressions which have been employed in the foregoing specification are employed therein as terms of description and not of limitation, and there is no intention in the use of such terms and expressions of excluding equivalents of the features shown and described or portions thereof, it being recognized that the scope of the invention is defined and limited only by the claims which follow.

I claim:

1. An assembly for supporting an optical device, comprising:
   (a) a plurality of elongate feet, each said foot having a first end, a second end and a leg aperture disposed at said first end thereof for receiving an object to serve as a leg; and
   (b) fastener means for attaching said feet to said optical device at a point of attachment so as to extend outwardly from said second end to said first end away from said optical device, said feet being flat from their leg aperture to their point of attachment.

2. The assembly of claim 1, wherein said feet are adapted to extend outwardly away from said optical device in selected different directions relative to each other.

3. The assembly of claim 1, wherein said optical device has a footprint of predetermined dimensions and shape, and said feet have dimensions and a shape substantially the same as the footprint of said optical device.

4. The assembly of claim 1, wherein at least one of said feet includes a plurality of said leg apertures disposed at said first end thereof, each of said plurality of leg apertures having a different size or shape for receiving a variety of objects to serve as a leg.

5. The assembly of claim 1, wherein said optical device has an adapter hole disposed therein, and each of said feet further includes a carrier aperture disposed therethrough at a common location relative to each of said other feet so as to align with the adapter hole of said optical device.

6. The assembly of claim 5, wherein said feet are adapted to extend outwardly away from said adaptor hole of said optical device at selected different directions relative to each other.

7. The assembly of claim 5, wherein said fastener means comprises a fastener having threads at one end thereof for screwing said fastener into said adaptor hole of said optical device, a head at the other end thereof to facilitate screwing and tightening said fastener into said adaptor hole, and a shank disposed between said ends of said fastener for placement through respective carrier apertures of said feet.

8. The assembly of claim 7, wherein said head of said fastener has three substantially symmetrically disposed wings.

9. The assembly of claim 7, wherein said head of said fastener is a knurled knob.

10. An assembly for supporting an optical device, comprising:
   (a) a plurality of elongate, substantially flat feet, each said foot having a first end, a second end and a leg aperture disposed at said first end thereof for receiving an object to serve as a leg; and
   (b) fastener means for attaching said feet to said optical device so as to extend outwardly from said second end to said first end away from said optical device, at least one of said feet including a knife edge formed therein.

11. A method for supporting an optical device, comprising the steps of:
   (a) fixedly attaching to said optical device at a point of attachment a plurality of elongate, substantially flat feet, each of said feet having a first end and a second end and a leg aperture disposed at said first end thereof for receiving an object to serve as a leg so that each of said feet extends outwardly from said second end to said first end away from said optical device, said feet being flat from their leg aperture to the point of attachment; and
   (b) placing in said leg aperture of at least one of said feet an object to serve separately as a leg.

12. The method of claim 11, wherein said placing step comprises placing a ski pole in said aperture of at least one of said feet.

13. The method of claim 11, wherein said placing step comprises placing an arrow in said aperture of at least one of said feet.

14. The method of claim 11, wherein at least one of said feet includes a plurality of leg apertures disposed at said first end thereof, each of said plurality of leg apertures having a different size or shape for receiving a variety of objects to serve as a leg, said method further comprising the step of selecting a suitable leg aperture for receiving an object to serve as a leg.

15. The method of claim 11, wherein said optical device includes an adaptor hole and each of said feet further includes a carrier aperture disposed therethrough at a common location relative to each of said other feet so as to align with the adaptor hole of said optical device, said attaching step comprising placing a fastener through said carrier aperture into said adapter hole.

16. The method of claim 15, wherein said fastener comprises a fastener having threads at one end thereof for screwing said fastener into said adaptor hole of said optical device, a head at the other end thereof to facilitate screwing and tightening said fastener into said adaptor hole, and a shank disposed between said ends of said fastener for placement through respective carrier apertures of said feet, said attaching step comprising tightening said threaded fastener in said adapter hole.

17. The method of claim 15, further comprising the steps of adjusting the positions of said feet so as to extend outwardly away from said adaptor hole of said optical device at selected different directions relative to each other.

18. The method of claim 11, wherein said optical device has a substantially flat base and said plurality of feet are substantially flat, said method further comprising the step of releasing said plurality of feet from said optical device, moving said plurality of feet substantially under the base of said optical device and fixedly attaching said plurality of feet in that new position.

19. A method for supporting an optical device, comprising the steps of:
   (a) fixedly attaching to said optical device a plurality of elongate, substantially flat feet, each of said feet having a first end and a second end, a leg aperture disposed at said first end thereof for receiving an object to serve as a leg so that each of said feet extends outwardly from said second end to said first end away from said optical device, and at least one of said feet including a knife edge formed therein;

(b) placing in said leg aperture of at least one of said feet an object to serve independently as a leg; and (c) using said knife edge to shape at least one object for placement in said leg aperture of one of said feet.

20. An assembly for supporting an optical device having an adaptor hole disposed therein, comprising:

(a) a plurality of elongate feet, each said foot having a first end, a second end, a leg aperture disposed at said first end thereof for receiving an object to serve as a leg, and an H-shaped carrier aperture disposed therethrough at a common location relative to each of said other feet so as to align with the adapter hole of said optical device; and (b) fastener means for attaching said feet to said optical device so as to extend outwardly from said second end to said first end away from said optical device.

21. An assembly for supporting an optical device having an adaptor hole disposed therein, comprising:

(a) a plurality of elongate feet, each said foot having a first end, a second end, a leg aperture disposed at said first end thereof for receiving an object to serve as a leg, and a plurality of carrier holes disposed therethrough at common locations relative to said other feet so as to align with adapter holes of one or more optical devices while permitting said feet to be stored symmetrically beneath the optical device, said feet being flat from said leg aperture to the furthest away of said plurality of carrier holes; and (b) fastener means for attaching said feet to said optical device so as to extend outwardly from said second end to said first end away from said optical device.

22. A method for supporting an optical device, having an adapter hole disposed therein, comprising the steps of:

(a) fixedly attaching to said optical device a plurality of elongate feet, each of said feet having a first end, a second end, a leg aperture disposed at said first end thereof for receiving an object to serve as a leg, and an H-shaped carrier aperture disposed therethrough, so that each of said feet extends outwardly from said second end to said first end away from said optical device by placing a fastener through said H-shaped carrier aperture into said adapter hole; and (b) placing in said leg aperture of at least one of said feet an object to serve as a leg.

23. A method for supporting an optical device, having an adapter hole disposed therein, comprising the steps of:

(a) fixedly attaching to said optical device a plurality of elongate feet, each of said feet having a first end, a second end, a leg aperture disposed at said first end thereof for receiving an object to serve as a leg, and a plurality of said carrier holes disposed therethrough at common locations relative to each of said other feet, so that each of said feet extends outwardly from said second end to said first end away from said optical device by placing a fastener through said a plurality of carrier holes into said adapter hole said feet being flat from said leg aperture to the farthest away of said plurality of carrier holes; and (b) placing in said leg aperture of at least one of said feet an object to serve as a leg.

* * * * *